US012332933B2

(12) United States Patent
Tiwari et al.

(10) Patent No.: US 12,332,933 B2
(45) Date of Patent: Jun. 17, 2025

(54) SYSTEMS AND METHODS FOR DOCUMENT PARTITIONING AND PARTITION LABELING

(71) Applicant: JPMORGAN CHASE BANK, N.A., New York, NY (US)

(72) Inventors: Saurabh Tiwari, Bangalore (IN); Tuhin Bhura, Kolkata (IN); Shashanka Narayan, Chicago, IL (US); Vikas Gautam, Bengaluru (IN); Ashwarya Gupta, Bangalore (IN); Ponnappa Ponjanda Appaiah, Mysore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/458,078

(22) Filed: Aug. 29, 2023

(65) Prior Publication Data

US 2025/0021592 A1    Jan. 16, 2025

(30) Foreign Application Priority Data

Jul. 13, 2023    (IN) .............................. 202311047328

(51) Int. Cl.
| | | |
|---|---|---|
| *G06F 16/30* | (2019.01) | |
| *G06F 16/22* | (2019.01) | |
| *G06F 16/27* | (2019.01) | |
| *G06F 16/31* | (2019.01) | |
| *G06F 16/383* | (2019.01) | |
| *G06F 16/20* | (2019.01) | |

(52) U.S. Cl.
CPC ........ *G06F 16/383* (2019.01); *G06F 16/2264* (2019.01); *G06F 16/278* (2019.01); *G06F 16/316* (2019.01)

(58) Field of Classification Search
CPC .............................. G06F 16/383; G06F 16/316
See application file for complete search history.

(56) References Cited

U.S. PATENT DOCUMENTS

| | | | |
|---|---|---|---|
| 2016/0232204 A1* | 8/2016 | Zholudev | .............. G06F 40/117 |
| 2022/0405336 A1* | 12/2022 | Lippe | .................. G06F 16/3344 |
| 2023/0136059 A1* | 5/2023 | Dwivedi | ................. G06F 40/40 704/9 |

\* cited by examiner

*Primary Examiner* — Kristopher Andersen
(74) *Attorney, Agent, or Firm* — GREENBERG TRAURIG LLP (57) ABSTRACT

In some aspects, the techniques described herein relate to a method including: receiving, at a platform, an electronic document and corresponding metadata; encoding the electronic document; sending the encoded document as a byte stream to a unit extraction service; decoding, by the unit extraction service, the byte stream into a string file; standardizing, by the unit extraction service, partition separation characters; determining, by the unit extraction service and based on the partition separation characters, a value of a first key; assigning, by the platform, a value of the corresponding metadata as a value of a second key; indexing the first key, the value of the first key, the second key, and the value of the second key in a search index; and providing a search function via an interface of the platform, wherein the search function searches the search index.

6 Claims, 4 Drawing Sheets

FIGURE 4

SYSTEMS AND METHODS FOR DOCUMENT PARTITIONING AND PARTITION LABELING

RELATED APPLICATIONS

This application claims the benefit of Indian patent application No. 202311047328, filed Jul. 13, 2023, the disclosure of which is hereby incorporated, by reference, in its entirety.

BACKGROUND

1. Field of the Invention

Aspects generally relate to systems and methods for document partitioning and partition labeling.

2. Description of the Related Art

Unstructured data contained in large documents is difficult for end users to consume and use. Where there is a repository of large documents, the ability to sort through each document and find particular subject matter becomes largely impractical, since reading each document to locate desired information may take more time than simply recreating the desired information. Any partitioning of information in the document, in an attempt to categorize the information in the document must be done manually. But generally, manual partitioning is not very fine-grained, and users may still need to read several large, partitioned sections of a document in order to locate particular information. Inefficiencies in locating information in unstructured documents can result in organizational costs. Such costs can be avoided with technology that efficiently breaks documents into relatively small, logical component parts and correctly labels the parts for frictionless location and consumption of information.

SUMMARY

In some aspects, the techniques described herein relate to a method including: receiving, at a platform, an electronic document and corresponding metadata; encoding the electronic document; sending the encoded document as a byte stream to a unit extraction service; decoding, by the unit extraction service, the byte stream into a string file; standardizing, by the unit extraction service, partition separation characters; determining, by the unit extraction service and based on the partition separation characters, a value of a first key; assigning, by the platform, a value of the corresponding metadata as a value of a second key; indexing the first key, the value of the first key, the second key, and the value of the second key in a search index; and providing a search function via an interface of the platform, wherein the search function searches the search index.

In some aspects, the techniques described herein relate to a method, wherein the first key, the value of the first key, the second key, and the value of the second key are stored in a standardized format.

In some aspects, the techniques described herein relate to a method, wherein the standardized format is a JavaScript Object Notation (JSON) format.

In some aspects, the techniques described herein relate to a method, wherein the first key indicates a logical partition of the electronic document, and wherein the value of the first key includes an index number of the logical partition.

In some aspects, the techniques described herein relate to a method, including: determining, by the unit extraction service and based on the partition separation characters, a value of a third key, wherein the third key indicates a lowest-level logical partition that the unit extraction service is configured to determine, and wherein the value of the third key is text from the lowest-level logical partition.

In some aspects, the techniques described herein relate to a method, wherein the lowest-level logical partition is a paragraph.

In some aspects, the techniques described herein relate to a method, including: providing, by a machine learning model, a tag value based on the text from the lowest-level logical partition.

In some aspects, the techniques described herein relate to a method, wherein the tag value is stored in the standardized format.

In some aspects, the techniques described herein relate to a method, including: returning, by the search function, the value of the third key.

In some aspects, the techniques described herein relate to a method, including: receiving, from the interface of the platform, a tag value.

In some aspects, the techniques described herein relate to a method, wherein the tag value is stored in the standardized format.

In some aspects, the techniques described herein relate to a method performed by a partitioning and labeling platform, including: determining a first logical partition separation indicator in a string file, wherein the first logical partition separation indicator is for a first partition level in a partition hierarchy; setting a first variable value to a value of the first logical partition separation indicator; determining a second logical partition separation indicator in the string file, wherein the second logical partition separation indicator is for a second partition level in the partition hierarchy; setting a second variable value to a value of the second logical partition separation indicator; determining a third logical partition separation indicator in the string file, wherein the third logical partition separation indicator is for the first partition level in the partition hierarchy; writing the first variable value to a data structure, wherein the data structure has a standardized format; writing the second variable value to the data structure; persisting the data structure to a search index; and clearing the first variable value and the second variable value.

In some aspects, the techniques described herein relate to a method, wherein writing the first variable value to the data structure and writing the second variable value to the data structure is triggered by determining the third logical partition separation indicator in the string file.

In some aspects, the techniques described herein relate to a method, further including: setting the first variable value to a value of the third logical partition separation indicator.

In some aspects, the techniques described herein relate to a method, wherein the data structure is a key-value data structure.

In some aspects, the techniques described herein relate to a method, wherein the key-value data structure is formatted as JavaScript Object Notation (JSON).

In some aspects, the techniques described herein relate to a method, wherein the first variable value is written to the data structure as a value that corresponds to a first key, and wherein the first key indicates a relatively higher partition level in the partition hierarchy with respect to the second partition level in the partition hierarchy.

In some aspects, the techniques described herein relate to a method, wherein the second variable value is written to the data structure as a value that corresponds to a second key, and wherein the second variable value is text of a paragraph in the string file.

DETAILED DESCRIPTION

Aspects generally relate to systems and methods for document partitioning and partition labeling.

Digital documents are generally formatted according to traditional conventions including paper size standards and logical partitions. That is, digital documents include both pre-defined and user-inserted partitions. Since, generally upon creation of a document, a creating user logically partitions a document into paragraphs, sections, articles, etc., these logical partitions may be used as partition units for aspects, herein. Aspects may arrange partitions into a machine-readable format for ease of processing and efficiency of searches. Moreover, aspects may perform processing to label formatted partitions with categorical labels. Formatted and labelled partitions may then be easily searched, displayed, etc., for end-user consumption.

Additionally, advanced machine learning (ML) techniques may efficiently process partitions formatted as described herein. ML techniques can learn from historical partition data and provide accurate categorical labeling for incoming documents. ML techniques can also analyze partition content and provide information about the content, such as problematic verbiage in partitions with respect to legal, financial, regulatory, etc., perspectives. Partitions deemed problematic can be systematically removed/replaced with language that has been approved under organizational standards.

Unless otherwise noted, references to documents herein refer to digital documents, such as word processor documents, portable document format (PDF) documents, text files, etc.

In accordance with aspects, a partitioning and labeling platform (also referred to herein as a "platform") may include front-end services that may facilitate interaction with human users and with other systems and may receive digital documents and metadata via such interactions. For instance, front-end services may provide a user interface, such as a graphical user interface. The interface may allow an end user to upload digital documents to the platform for storage, partition processing, partition indexing, etc. One or more front-end-service interfaces may further allow metadata associated with a document to be received and stored for later retrieval and processing by platform components. Front end services may also provide a search interface that allows a platform user to search an index of document partitions provided by the platform.

Additionally, front-end services may publish an application programing interface (API) or make calls to another system's published API to obtain digital documents and associated metadata for processing as described herein. Front-end services may include one or more application programming interfaces (APIs) that may be configured to allow other organizational systems to make API calls to the front-end services, including parameterized method calls. The API calls may take a document as a method argument and may include functionality to persist included documents to a datastore of the platform. Other API methods may receive or provide document metadata. In other aspects, front-end services may be configured to interface with APIs of other organizational systems and make API calls that request one or more documents and/or metadata from various other organizational systems. A user interface provided by platform front-end services may receive data and make API calls to platform services that provide received documents and metadata.

In accordance with aspects, front-end services may be configured for operative communication with a metadata store. A metadata store may store metadata about documents received at platform front-end services. The metadata may include such information as a document file type, a document file name, a document title, an organizational department and subdepartment that owns the document, a document author, etc. Aspects may prompt an uploading using for metadata, may extract metadata from an uploaded or otherwise retrieved or received file, or may provide for a combination of metadata extraction and user-provided metadata. Front-end services may be configured to extract certain types of document metadata from a document's object model and may be configured to recognize what metadata a particular document type exposes through its object model. A metadata store may receive and store any metadata that is necessary or desirable for document processing as described herein. A metadata store may be any suitable data store, such as a relational database, etc.

In accordance with aspects, documents received via an interface of a partitioning and labeling platform may be persisted in a document store and may be available for further processing by the platform. A document store may be any suitable datastore, such as a relational database, a data lake, etc., that stores documents such as legal documents, financing documents, and/or other digital documents used and/or produced by an organization. A document store may facilitate storage of documents in their native format, and documents may be stored as binary large objects (BLOBS). A document store may be configured for operative communication with platform front-end services and may receive documents that are sent to or retrieved by platform front-end services.

A document may be stored with an association to a unique document identifier (ID). The unique identifier may be any suitable identifier and may be provided by a user (e.g., a document name), may be provided programmatically (e.g., a randomly generated and assigned primary key), or may be a combination of both platform provided and user provided information (e.g., a generated key and a document name that are both used as a primary key). Where a system-generated primary key is provided as part or all of a unique document ID, the key may be generated at a metadata store, at a document store, or at some other platform component. Regardless of where or how a unique document ID is generated, or what the unique ID is comprised of, the associated document and all associated document metadata may be stored in a metadata store or a document store (as appropriate) with a reference or relation to the unique document ID.

In accordance with aspects, receipt of a document and corresponding document metadata at platform front-end services may initiate a process flow involving components of a platform. As described in more detail herein, a received document and content therein may be sent to a document store for persistence, while document metadata may be persisted in a metadata store. Front-end services may then send a message to a message queue service indicating that a document and document metadata have been received.

A messaging queue may be configured as a queue data structure and may facilitate communication between disparate systems or services. Services (e.g., front-end services) may place messages on the queue and may subscribe to and consume messages from the queue. A service or application that submits messages to a messaging queue may be referred to as a producer, and a service or application that consumes messages from a messaging queue may be referred to as a consumer. Communications to/from a message queue may be asynchronous. That is, the messages may be placed on the queue by one service at one time and may be consumed from the queue by another service at another time, and a producer need not wait for a response from a consumer before continuing with other processing tasks. The messaging queue stores the message until a consumer consumes it. The messaging queue may include a message broker. A message broker can translate a message from a protocol or format that it is received in from a producer to a protocol or format that it is consumed in by a consumer.

In an exemplary aspect, for each digital document and corresponding metadata received via platform front-end services, a message may be sent to a messaging queue, e.g., via a producer API call. A service configured as a consumer of the messaging queue may check the messaging queue for new messages placed thereon, e.g., via a consumer API call, and if a new message is present or received, may initiate further processing of a received document and corresponding metadata.

In accordance with aspects, a search and index service may be configured as a consumer of a messaging queue and may initiate further processing of received documents when a message is received from the messaging queue. A message sent to a messaging queue may include a unique document identifier that identifies a document and corresponding metadata received with a document. Upon receipt of a message from a messaging queue that includes a unique document ID, a search and index service may retrieve metadata associated with a received document. Metadata may be retrieved via platform front-end services from a metadata store. Retrieval of metadata may include an API call to the front-end services, where an API method takes a unique document ID as a parameter and returns document metadata associated with the unique document ID.

In other aspects, metadata related to a unique document ID may be sent as part of a message placed on a messaging queue, such that metadata associated with a received document is received by a consumer as a message from the messaging queue. In still other aspects, a hybrid method may be used where some metadata is received in a message from a messaging queue and other metadata is received from front-end services via, e.g., an API call to front-end services.

In accordance with aspects, upon receiving a unique document ID, a search and index service may initiate additional operations provided by the search and index service and by other platform services. For instance, receipt of a unique document ID may initiate a metadata indexing operation. A metadata indexing operation may begin indexing metadata that is related to a unique document ID and that is received by a search and index service (e.g., either via an API call to front end services or via a message queue). A search and indexing service may index metadata related to a document and unique document ID in a search index. A search index may be any datastore that is suitable for indexing operations. A search index may index data, including document metadata as a set of keys, where the keys are descriptive names of fields or properties, and each key has a value. The value may include metadata or other data received by a search and index service. The keys may be standardized for a document or for a particular document partition type that will be searched on. The key-value pairs may be structured in a standardized format, such as JSON, XML, etc., and may take the form of a file formatted as the designated structure (e.g., a JSON file, and XML file, etc).

In addition to metadata indexing, a search and indexing service may invoke a data capture service. In accordance with aspects, a data capture service may retrieve a document related to a received unique document ID from a document store and may perform text capturing services on the retrieved document. Data capture services may be invoked via an API call to the data capture services. For instance, data capture services may expose an API method that takes a unique document ID as a parameter. A platform service, such as a search and indexing service, may pass a unique document ID to data capture services via the exposed API method. Upon receipt of the unique document ID, the data capture services may retrieve a document associated with the unique document ID from a document store and may perform further processing of the retrieved document.

In accordance with aspects, a data capture service may determine what file type a retrieved document is formatted as (e.g., a PDF document, a word processor document, etc.) and may further determine (if necessary, e.g., in the case of a PDF document) whether the document includes text or an image of text. If the document is determined to be an image of text, data capture services may perform an optical character recognition (OCR) operation on the document. An OCR operation may extract text from an image and save the document as a text-based document, including the extracted text from the OCR operation. If an OCR operation is not necessary (i.e., if the document is a text-based document), data capture services may not perform an OCR operation and may advance to other document processing operations. For instance, a data capture service may parse text from a document into a text file (e.g., a .txt file). Data capture services may generate and provide both a native-format document including text (in some cases after an OCR operation) and/or a text-file formatted (e.g., a .txt file) containing text from a corresponding native format document to various services of a platform for additional processing operations.

In accordance with aspects, a data capture service may provide text from a document to a unit extraction service for additional processing. For instance, a text file including text parsed from a document may be sent to a unit extraction service, and a unit extraction service may process the text with partitioning logic that partitions the text into logical partitions. A unit extraction service may expose an API method that takes one or more parameters and may receive the text data and other data from, e.g., a data capture service, as parameters via the API method. An exemplary API method may accept parameters such as a document name (including a file type/extension), a unique document ID, an encoded document file, an authorization token, etc.

An authorization token may be checked by the platform and may indicate whether the sender or owner of the document is a registered and/or authenticated user of the platform, for security purposes. In some aspects, only a registered and/or authenticated user may initiate platform processing of a document. The file extension parameter may be checked to assure that only supported file types are processed. Aspects may support .txt file types, .pdf file types, etc.

In accordance with aspects, a data capture service, or other platform service, may perform an encoding operation on a document file that includes text. A text encoding scheme, such as a Base64 encoding scheme, may be used to encode the document file. The encoded file may be transmitted as a byte stream. Encoding the document file provides benefits when transmitting a file as a byte stream, such as efficiency and content verification/validation.

A platform service may then call an API method exposed by a unit extraction service and may pass the encoded file to the unit extraction service. The unit extraction service may determine that the received encoded file is complete (i.e., determine that no part of the encoded file was lost in transmission) through validation procedures and parameters included in the encoded file.

A unit extraction service may be configured to accept various file types such as text-based (e.g., .txt) files and PDF files as an encoded byte stream. Upon receipt of a document as a byte stream, a unit extraction engine may execute various processes to convert the byte stream into a string file. For instance, when a PDF file is received as a byte stream, the byte stream may include additional information beyond text that is included in the PDF document due to encoding of the document's object model data. Document object model data may be processed separately before writing the byte stream to a string file. For instance, in the case of a PDF, a PDF extraction tool may be used to extract object model data, such as page numbers and breaks, header data, footer data, etc. A PDF extraction tool may further extract text from the main body of a PDF, including characters such as carriage returns. Conversely, a text file received as a byte stream includes only encoded text characters and may be written directly from a byte stream to a string file.

In accordance with aspects, a string file (such as, e.g., a BytesIO string file created in the Python programming language) may be created directly or indirectly from a byte stream received by a unit extraction engine. For instance, if a PDF file is received, a string file may be produced as output from a PDF extraction tool as an intermediary process, since a PDF extraction tool understands a PDF document model and can convert model information into text characters. A text file received as a byte stream, on the other hand, may be written directly to a string file. A resultant string file, whether from a PDF byte stream, a text file byte stream, or otherwise, may be further processed to standardize the string file.

A string file may be normalized via standardization operations that may be executed in order to prepare the file for parsing. Normalization operations may be necessary due to different character encoding schemes of a base/original document (e.g., UTF-8 vs. ASCII encoding), or due to different document object model characters or values indicating different functionality and characteristics. For example, any instances of "\r" and "\rn" (characters indicating a carriage return or a new line, respectively) may be standardized by replacing them with "\n" to normalize the string file. Accordingly, a unit extraction engine can determine, based on the standardized line feed character, where a new paragraph begins in the string file of text characters.

Once a string file is standardized/normalized, a unit extraction service can parse the string file and determine text falling within a particular logical unit and/or a hierarchy of logical units. For instance, the smallest unit of extraction may be a paragraph of text. Paragraphs may be determined to fall within higher-level logical units, such as chapters, articles, etc. The determined units may be captured in a standardized format, such as a key-value format (e.g., a JSON format). Actual text may also be captured in the standardized format. The standardized format may then be included in a search index.

In accordance with aspects, a unit extraction service may parse a string file for a page number index. The page number index may be represented by a numeral value in the string file. Non-page index numerals may be differentiated through logic that notes previous page numbers and looks for an expected subsequent number. Other page-number differentiating logic may be configured to recognize recurring header and/or footer information in the string file. Based on a numeric character's position with respect to recurring header and/or footer information, logic may determine a numeric character to be a page number index numeral. The page number of a determined logical unit may be included in a standardized format for indexing, as discussed herein. Once a page is determined within the string file, text from the determined page may be extracted. Since the string file may be normalized in previous processing, all page index determinations may be based on the same page index determination logic.

Text characters extracted from a page of the document may be appended to a list. The page text included in the list may be further parsed based on standardized paragraph separators. For example, text between two "\n" separators may be determined to be a paragraph. Paragraphs may be further inspected to determine a higher-level logical unit that may classify the text. For instance, paragraph text may be parsed to determine a chapter, an article and/or a section. Other logical partition units may be determined as based on unit extraction logic.

In an exemplary aspect, a legal document may be evaluated by a unit extraction engine. Often, legal documents are divided into articles, sections, and then paragraphs. Unit extraction logic can be programed to parse a string file and determine when the word "ARTICLE" appears within a paragraph. In some aspects, unit extraction logic may be configured to determine when the word "ARTICLE" appears at the beginning of a paragraph (i.e., when the word "ARTICLE" follows a paragraph separator, and is then followed by other words or another paragraph separator, such as "ARTICLE I Definitions"). Article index numerals may also be captured, and logic may be supplied to determine, e.g., roman numerals for articles that are found. Article index numeral detection logic may be similar to page number index determination logic.

A legal document may also be logically partitioned into sections. A unit extraction service may provide section extraction logic. For instance, section extraction logic may be configured to parse a paragraph and determine when a paragraph starts with the word "SECTION" and when the word "SECTION" is followed by a float value (e.g., 1.0, 1.10, 2.1, etc.). In other aspects, section extraction logic may be configured to determine if a paragraph starts with a float value and if the float value is followed by a title ending with a period (e.g., "2.13 Intellectual Property." Other logic modelled after article presentation patterns, section presentation patterns, or other logical document partition presentation patterns, and configured to extract logical partitions based on presentation patterns may be included.

In accordance with aspects, a document may be parsed, and a document hierarchy may be extracted according to logical determinations of a hierarchy pattern presented in the analyzed document. The document hierarchy may be captured and may be used as descriptive and/or classifying metadata in a standardized format that may be used in a search index. In accordance with aspects, text from a lowest-level logical partition that his determined/extracted by a unit extraction service may be included in a standardized format. Higher-level partitions may be included as additional key-value pairs that classify and describe the lowest level logical partition.

In accordance with aspects, a unit extraction service may include logic to determine if a given paragraph starts with a top-level logical partition. The top-level partition may be recognized and extracted and a variable for holding the top-level partition may be set to the value of the top-level partition. This value may remain as partition units are evaluated by the service and may only be reset to a different value when a next top-level logical partition is determined. Upon a top-level variable being set, a variable for holding a lower-level logical partition may be reset to the next-determined lower-level partition value. For instance, in the exemplary case of a legal document, once a new article is determined, a section title variable and a section index number variable may be reset. Extraction operations/logic may continue to determine the next section title and index number (as described, above) and set the variables to the detected values. This sequence can continue down to a lowest-level variable (e.g., a paragraph, or paragraph text that follows a detected higher-level partition).

In accordance with aspects, once an extraction operation determines a lowest-level partition, all variables that represent higher-level partitions may be set to determined values. Remaining text that forms the lowest-level partition may be extracted and placed in a standardized format for use in a search index (e.g., included as a value of a key value pair in a standardized format). If a lowest-level partition is determined not have one or more higher-level partition values (e.g., if a paragraph does not have a section title and index number), then the variable for the undetermined higher-level partition may remain or be set to null or empty. All variables may then be written as output to a standardized format, and the standardized format may be used as an entry in a search index for the lowest-level partition. The search index may index on the variables provided in the standardized format.

In accordance with aspects, an exemplary standardized format may be a key-value pair format and may be further formatted in a JSON format. For instance, an exemplary standardized format for a legal document may be constructed as follows:

```
para_partition = {
    'paraId': "",
    'articleHeader': "ARTICLE 1",
    'sectionHeader': "Section 1.1",
    'paraHeader': "",
    'tags': [
        {
            "tagType": "identifiedTags",
            "keywords": [ ],
            "description": ""
        },
        {
            "tagType": "assignedTags",
```

-continued

```
            "keywords": [ ],
            "description": ""
        }
    ],
    'docPageNo': "1",
    'tocPageNo': "",
    'paraText': "Exemplary paragraph text. Extracted
        paragraph text, as the lowest-level
        partition, goes here..."
}
```

The exemplary standardized format above shows key-value pairs having JSON formatting. Variables from a unit extraction service may be output into such a standardized format. In the example, above, the text for the lowest-level logical partition that is determined, in this example, a paragraph, is output as the value corresponding to the key "paraText." As can be further seen, determined values for keys "articleHeader," "sectionHeader," "docPageNo," etc., are output from a unit extraction service. A "paraID" key value may be a unique identifier of a paragraph within a document. A "tocPageNo" key may refer to a page number printed on the page of a document (e.g., that a reader can observe and that may be referenced in a table of contents-hence the "toc" designation in the key name). A "docPageNo" key may refer to a document page number that references an actual page number of a corresponding page where the number begins at 1 with the first document page and is incremented for each page thereafter. The "tags" key, and sub keys thereunder, may include tags later assigned, or merged into, the standardized format, by other platform services. A unique document ID may also be included as a value (e.g., for a "docID" key). In some aspects, a docID key (not shown in the example, above) may be at a higher level of a standardized format (e.g., a "document" level), rather than the exemplary level shown above.

In accordance with aspects, a standardized format containing values extracted from a unit extraction service may be passed (e.g., as a return value to a called API method) from a unit extraction service to a data capture service. A data capture service, in turn, may pass the standardized format to a search and index service. Further, the search and index service may append, or merge metadata collected from a user interface into the standardized format as values that correspond to a tag type (e.g., "tagType" in the above example). The value may be "assignedTags" which may indicate tags that have been manually assigned (e.g., via a user of a platform interface and front-end services). Additionally, an analytics service may use a machine learning engine trained on historical data (e.g., previously indexed standardized data formatted as described herein) to train a machine learning model to predict additional tags based on similar values assigned to similar paragraphs. Tags assigned by a machine learning model may be designated with an "identifiedTags" value as their "tagType".

In accordance with aspects, a standardized format entry for each lowest level logical partition may be included in a search index. For instance, after receiving a standardized format entry, a search and index service may persist the entry to a search index. A search index may facilitate rapid searching based on keywords and other values as key values and can rapidly identify a document based on values in a provided standardized format. Providing a search index that indexes lowest-level partitions in this manner provides a much more efficient and time-effective search than a full-text document search across many documents. Searches may be executed based on any value of the provided key-value pairs, and related documents or links thereto may be returned rapidly without a full-text search of any natively formatted document.

Figure 1:
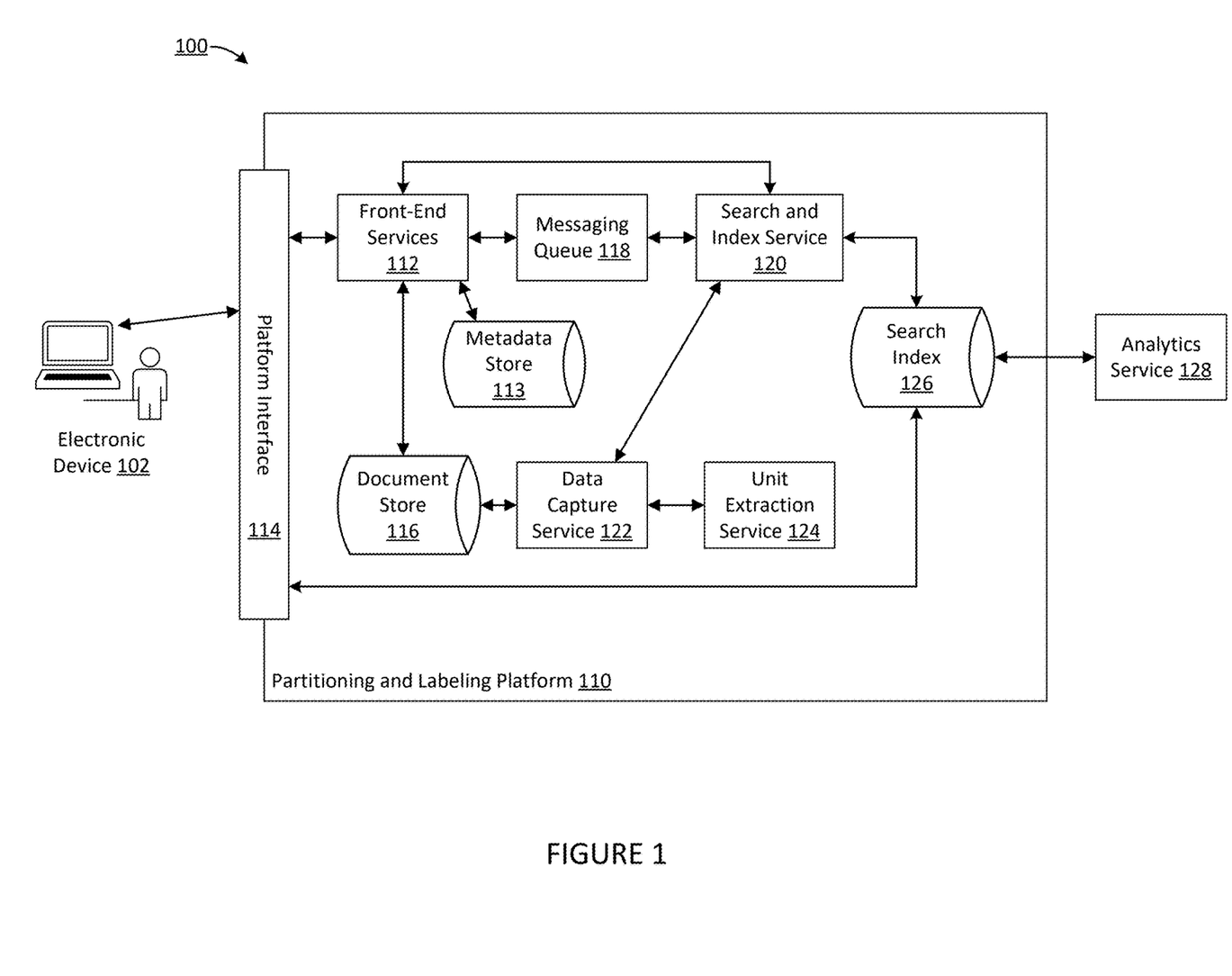
FIG. 1 is a block diagram of a system of a system for electronic document partitioning and labeling, in accordance with aspects.

FIG. 1 is a block diagram of a system of a system for electronic document partitioning and labeling, in accordance with aspects. System 100 includes electronic device 102, partition and labeling platform 110, and analytics service 128. Partition and labeling platform 110 includes front-end services 112, metadata store 113, platform interface 114, document store 116, messaging queue 118, search and index service 120, data capture service 122, unit extraction service 124, and search index 126. While analytics service 128 is shown as outside of, but in operative communication with, partition and labeling platform 110, it is contemplated that analytics service 128 may, in some aspects, be a dedicated service that is contained in partition and labeling platform 110. In accordance with aspects, metadata store 113 and document store 116 may be configured as any suitable data store for storing metadata and documents, respectively (e.g., relational databases, data lakes, data warehouses, etc.). Search index 126 may be configured as any suitable data store for persistence of and indexing of standardized data formats (e.g., standardized key-value pairs formatted as JSON entries) as described herein.

In accordance with aspects, a platform user may submit an electronic document to partition and labeling platform 110 for processing via platform interface 114. Platform interface 114 may also include one or more interfaces that facilitate submission of metadata associated with a submitted document, such as form fields, drop-down boxes, etc. In some aspects, platform interface 114 may include one or more APIs that interface programmatically with other organizational systems and/or platforms, and receive documents and corresponding metadata via the API(s).

In accordance with aspects, documents and corresponding metadata may be received from platform interface 114 at front-end services 112. Front-end services 112 may persist received metadata in metadata store 113 and may persist a received document in document store 116. The document and corresponding metadata may each be persisted with a unique document ID that uniquely identifies the document and related the document to its corresponding metadata (as described in more detail, herein). Moreover, front-end services 112, after receiving and persisting an electronic document and corresponding metadata, may place a message on messaging queue 118 including, at least, the unique document ID in the message. Front-end services 112 may be configured as a producer application with respect to messaging queue 118 and may utilize a producer API call to place the message on messaging queue 118.

In accordance with aspects, index service 120 may be configured as a consumer application with respect to messaging queue 118 and may consume the message placed on messaging queue 118 by front-end services 112. Index service 120 may receive via the consumed message at least the unique document ID, and may request the metadata associated with the unique document ID from front-end services 112. Front-end services 112 may retrieve the metadata associated with the unique document ID from metadata store 113 using the unique document ID as a lookup key in a query of metadata store 113 and may return the associated metadata to index service 120. Moreover, index service 120 may request document details in a standardized format from data capture service 122. Index service 120 may also pass the received unique document ID to data capture service 122, and may await document details in a return communication from data capture service 122.

Upon receipt of a unique document ID by data capture service 122, data capture service 122 may query document store 116 using the received unique document ID as a lookup key. Document store 116 may return the document associated with the unique document ID to data capture service 122 and data capture service 122 may begin processing of the returned document as described in further detail herein. For instance, data capture service 122 may determine if the retrieved document includes text characters or an image of text. If an image of text, data capture service 122 may proceed by performing an OCR operation on the document. Data capture service 122 may pass the document file to unit extraction service 124 for additional processing. Data capture service 122 may encode and pass a PDF document in its native format (e.g., after any OCR operations). Data capture service 122 may parse other document formats and write included text characters to a text file. A document (e.g., a PDF or a text document) may be passed as a byte stream to unit extraction service 124 via an API call to unit extraction service 124. The document file may be encoded by data capture service 122 before being sent as a byte stream and may be decoded by unit extraction service 124 after being received as a byte stream.

As discussed in more detail, herein, unit extraction service 124 may standardize any received files into a string file for processing. Unit extraction service 124 may parse standardized string files to extract a number of hierarchical partitions and may format the determined partitions in a standardized format, which includes the text of a lowest-level partition. Unit extraction service 124 may pass the determined partitions in the standardized format back to data capture service 122, which may, in turn, pass the standardized format on to index service 120. Index service 120 may merge the values with label values derived from the metadata associated with the subject document that was previously received by index service 120. That is (and as noted, above), index service 120 may merge keys and values with metadata also labeled with keys (where the metadata is the corresponding value) into the standardized format and may persist the an entry for each lowest-level partition in search index 126, where the entry is formatted in the standardized format.

In accordance with aspects, analytics service 128 may include a machine learning (ML) engine with a ML model and an ML training algorithm. The ML model may have been trained on historical data that is formatted in the standardized format and may predict additional values for standardized labels (e.g., additional values for standardized keys in a key-value data structure). Accordingly, labeling data may be enriched using ML techniques.

In accordance with aspects, platform interface 114 may provide an interface to a search function that allows searching, by an end user, of search index 126. In one aspect, a user (human or programmatic) may provide search criteria to platform interface 114, and an associated search function may search the indexed data and return relevant results to the search function user. The results may be text from a lowest-level logical partition, may be a document that is related to the search results (e.g., a natively formatted document related to the results), or other related results.

As discussed in more detail, herein, components of systems and methods described herein may expose various APIs for communication between components and other systems. APIs may publish various methods and expose the methods via API gateways. A published API method may be called by an application that is authorized to access the published API methods. API methods may take data as one or more parameters or arguments of the called method. API access may be governed by an API gateway associated with a corresponding API. Incoming API method calls may be routed to an API gateway and the API gateway may forward the method calls to internal API servers that may execute the called method, perform processing on any data received as parameters of the called method, and send a return communication to the method caller via the API gateway. A return communication may also include data based on the called method and its data parameters. API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

Figure 2:
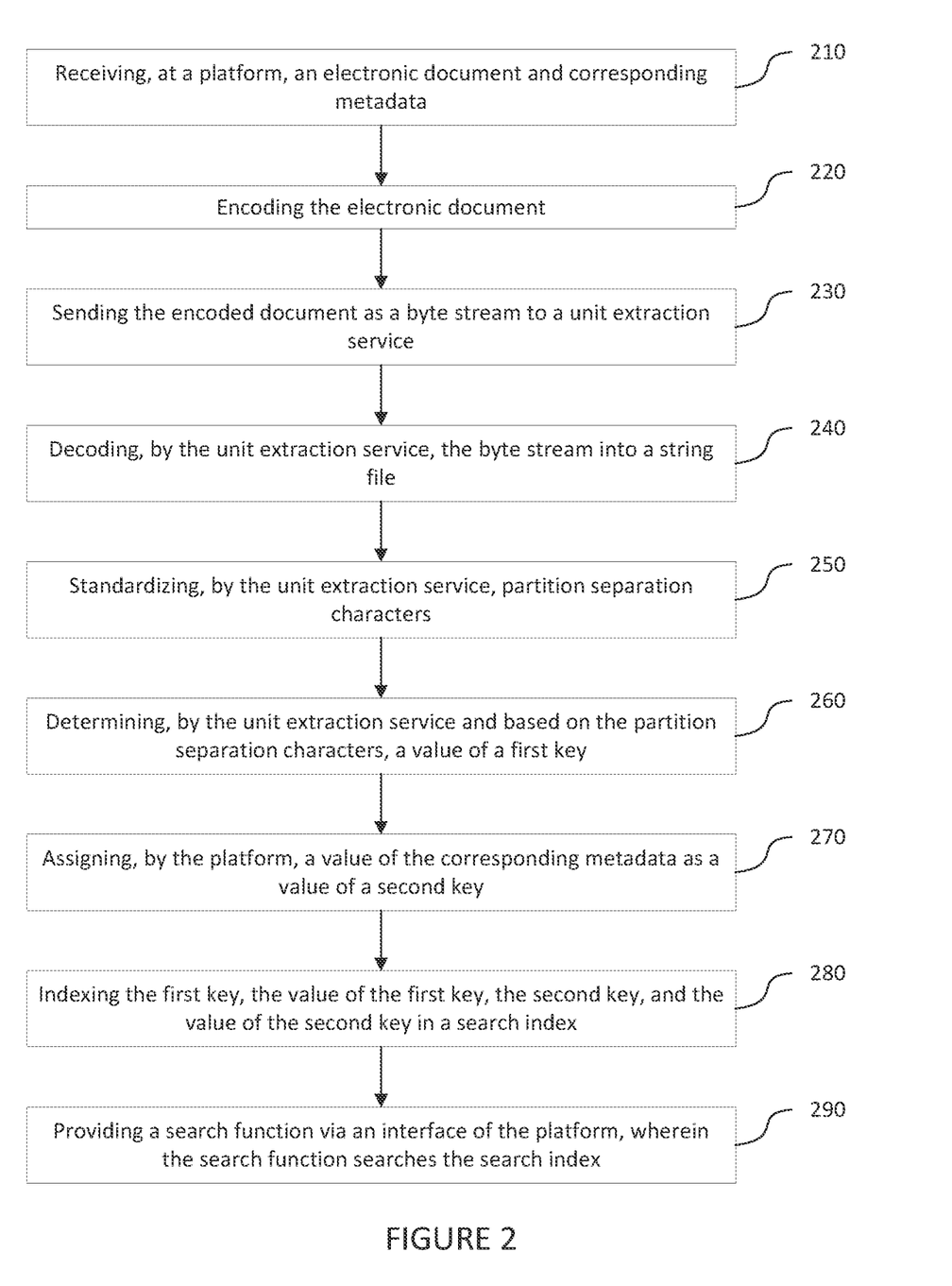
FIG. 2 is a logical flow for document partitioning and partition labeling, in accordance with aspects.

FIG. 2 is a logical flow for document partitioning and partition labeling, in accordance with aspects.

Step 210 includes receiving, at a platform, an electronic document and corresponding metadata.

Step 220 includes encoding the electronic document.

Step 230 includes sending the encoded document as a byte stream to a unit extraction service.

Step 240 includes decoding, by the unit extraction service, the byte stream into a string file.

Step 250 includes standardizing, by the unit extraction service, partition separation characters.

Step 260 includes determining, by the unit extraction service and based on the partition separation characters, a value of a first key.

Step 270 includes assigning, by the platform, a value of the corresponding metadata as a value of a second key.

Step 280 includes indexing the first key, the value of the first key, the second key, and the value of the second key in a search index.

Step 290 includes providing a search function via an interface of the platform, wherein the search function searches the search index.

Figure 3:
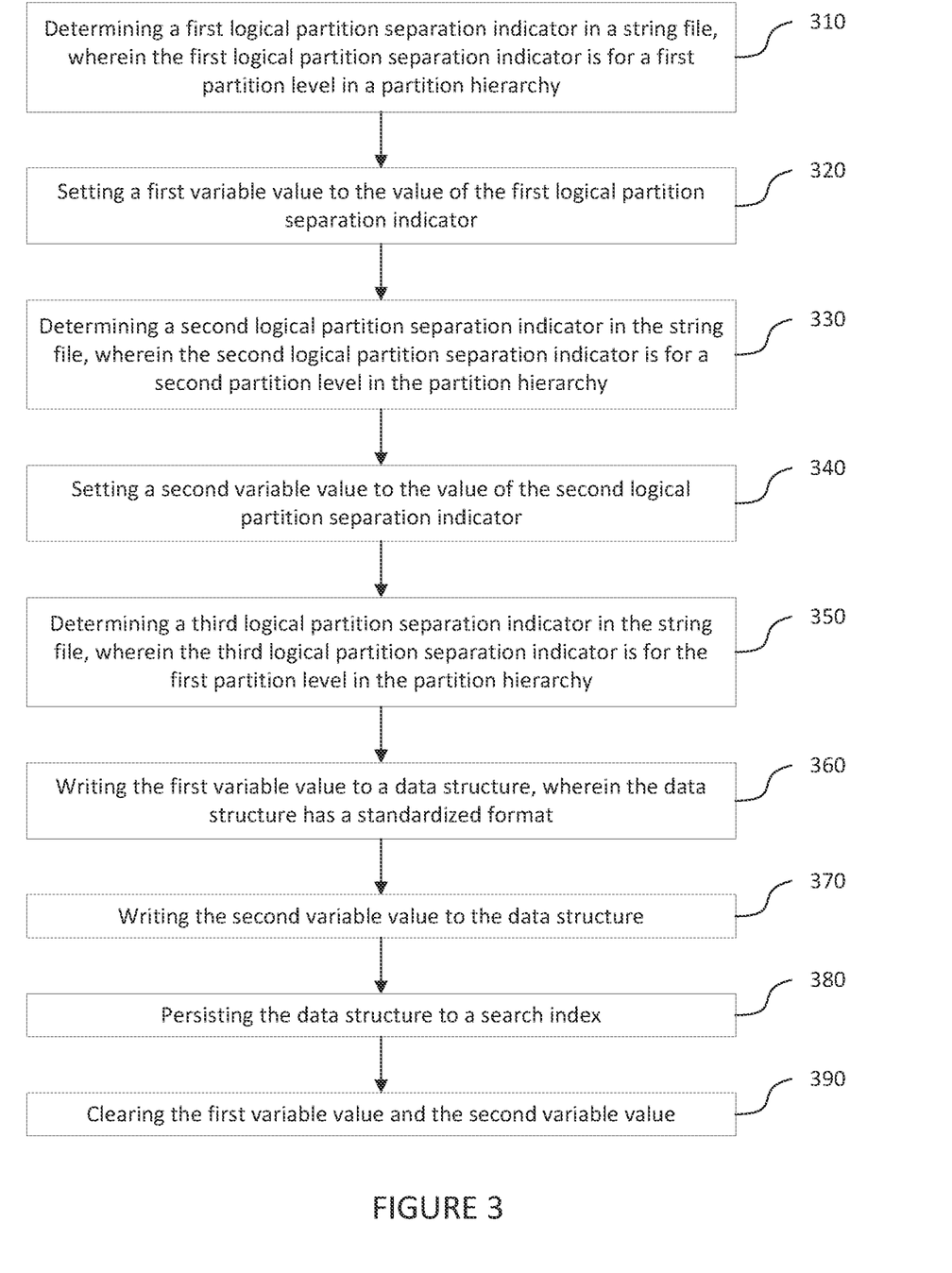
FIG. 3 is a block diagram of a computing device for implementing certain aspects of the present disclosure.

FIG. 3 is a logical flow for document partitioning and partition labeling, in accordance with aspects.

Step 310 includes determining a first logical partition separation indicator in a string file, wherein the first logical partition separation indicator is for a first partition level in a partition hierarchy.

Step 320 includes setting a first variable value to the value of the first logical partition separation indicator.

Step 330 includes determining a second logical partition separation indicator in the string file, wherein the second logical partition separation indicator is for a second partition level in the partition hierarchy.

Step 340 includes setting a second variable value to the value of the second logical partition separation indicator.

Step 350 includes determining a third logical partition separation indicator in the string file, wherein the third logical partition separation indicator is for the first partition level in the partition hierarchy.

Step 360 includes writing the first variable value to a data structure, wherein the data structure has a standardized format.

Step 370 includes writing the second variable value to the data structure.

Step 380 includes persisting the data structure to a search index.

Step 390 includes clearing the first variable value and the second variable value.

Figure 4:
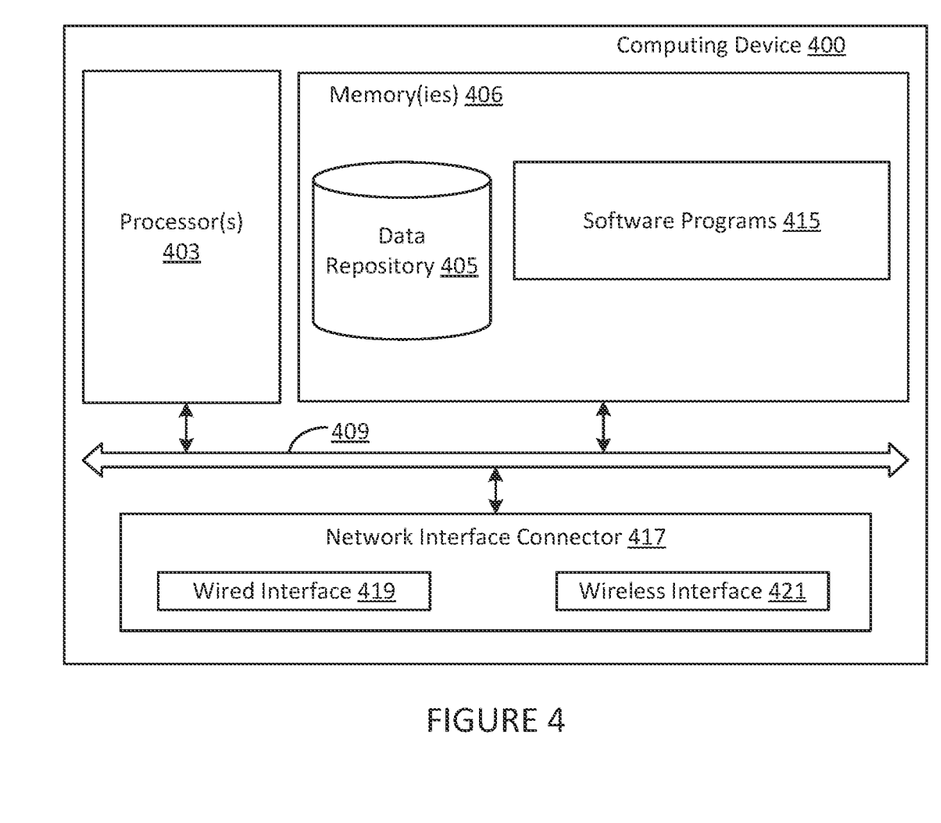
FIG. 4 is a logical flow for document partitioning and partition labeling, in accordance with aspects.

FIG. 4 is a block diagram of a computing device for implementing certain aspects of the present disclosure. FIG. 4 depicts exemplary computing device 400. Computing device 400 may represent hardware that executes the logic that drives the various system components described herein. For example, system components such as front-end services, a messaging queue, a search and index service, a data capture service, a unit extraction service, an interface, various database engines, database servers and other data stores, and other computer applications and logic may include, and/or execute on, components and configurations like, or similar to, computing device 400.

Computing device 400 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 400 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
   receiving, at a front-end service of a partition and labeling platform comprising a processor and a memory, an electronic document and corresponding metadata, the metadata comprising a file type;
   persisting, by the front-end service and to a document store of the memory of the partition and labeling platform, the electronic document with a unique document identification;
   persisting, by the front-end service and to a metadata store of the memory of the partition and labeling platform, the metadata corresponding to the electronic document with the unique document identification;
   receiving, by an index service of the partition and labeling platform and from the front-end service using a producer API call through a messaging queue, a message comprising the unique document identification;
   retrieving, by a data capture service and from the document store based on receiving the document identification from the index service, the electronic document from the document store using the document identification as a lookup key;
   determining, by the data capture service, whether the electronic document comprises text and, based on a determination that the electronic document comprises text, performing optical character recognition on the electronic document;
   encoding, by the data capture service, a text of the electronic document identified by the optical character recognition;
   sending, by the data capture service via an API call to a unit extraction service, the text of the encoded document as a byte stream;
   decoding, by the unit extraction service, the byte stream into a string file;
   standardizing, by the unit extraction service, a number of hierarchical partitions parsed from the string file by formatting the number of hierarchical partitions;
   determining, by the unit extraction service and based on the number of hierarchical partitions, a value of a first key, wherein the first key indicates a logical partition of the electronic document, wherein the value of the first key includes an index number of the logical partition;
   determining, by the unit extraction service and based on the partition separation characters, a value of a third key, wherein the third key indicates a lowest-level logical partition of the number of hierarchical partitions that the unit extraction service is configured to determine, and wherein the value of the third key is text from the lowest-level logical partition;
   providing, by a machine learning model of the partition and labeling platform, a tag value to the lowest-level logical partition;
   assigning, by the machine learning model, a predicted tag value to the lowest-level logical partition based on a similarity of the lowest-level logical partition to historical data;
   assigning, by the index service of the partition and labeling platform, a value of the corresponding metadata in the metadata store as a value of a second key;
   indexing, by the index service, the first key, the value of the first key, the second key, and the value of the second key in a search index; and providing, via a platform interface of the partition and labeling platform, a search function via an interface of the platform, wherein the search function searches the search index.

2. The method of claim 1, wherein the first key, the value of the first key, the second key, and the value of the second key are stored in a standardized format.

3. The method of claim 1, wherein the lowest-level logical partition is a paragraph.

4. The method of claim 1, wherein the tag value is stored in the standardized format.

5. The method of claim 1, comprising:
returning, by the search function, the value of the third key.

6. The method of claim 1, wherein the tag value is stored in the standardized format.

* * * * *